United States Patent [19]

Correa

[11] Patent Number: 5,047,855
[45] Date of Patent: Sep. 10, 1991

[54] PICTURE PICK-UP OR DISPLAY DEVICE FOR SUCCESSIVE SCANNING IN OPPOSING DIRECTION INCLUDES A CIRCUIT FOR ASSURING VERTICAL SYMMETRY OF THE VIDEO SIGNAL BEING DISPLAYED

[75] Inventor: Carlos C. R. Correa, Eindhoven, Netherlands

[73] Assignee: U.S. Philips Corporation, New York, N.Y.

[21] Appl. No.: 604,732

[22] Filed: Oct. 22, 1990

[30] Foreign Application Priority Data

Nov. 29, 1989 [NL] Netherlands ............... 8902939

[51] Int. Cl.⁵ .................................. H04N 5/04
[52] U.S. Cl. ................... 358/139; 358/148; 315/387
[58] Field of Search ........... 358/139, 148, 158, 219; 315/383, 389, 399, 411, 387

[56] References Cited

U.S. PATENT DOCUMENTS

| | | | |
|---|---|---|---|
| 4,510,527 | 4/1985 | den Hollander | 358/158 |
| 4,543,614 | 9/1988 | Chen | 358/139 X |
| 4,667,232 | 5/1987 | Long | 358/139 X |
| 4,672,449 | 6/1987 | Kraus et al. | 358/148 |

Primary Examiner—Victor R. Kostak
Attorney, Agent, or Firm—Edward W. Goodman

[57] ABSTRACT

A picture pick-up or display device for picking up a scene or for displaying a scene image includes a line deflection circuit for generating a symmetrical line deflection current, a video signal processing circuit having a memory for storing video information, and a clock oscillator for generating a read clock signal for the memory. The oscillator is controlled in such a way that a first and a second signal occur substantially simultaneously at measuring instants, the first signal originating from the line deflection circuit and the second signal originating from a signal generator. The first signal is applied by a maximum value detector substantially at the instant when the line deflection current has a maximum value. The measuring instants are substantially located at the instants when a counter counting the clock signal pulses supplies a count during the line blanking interval.

8 Claims, 1 Drawing Sheet

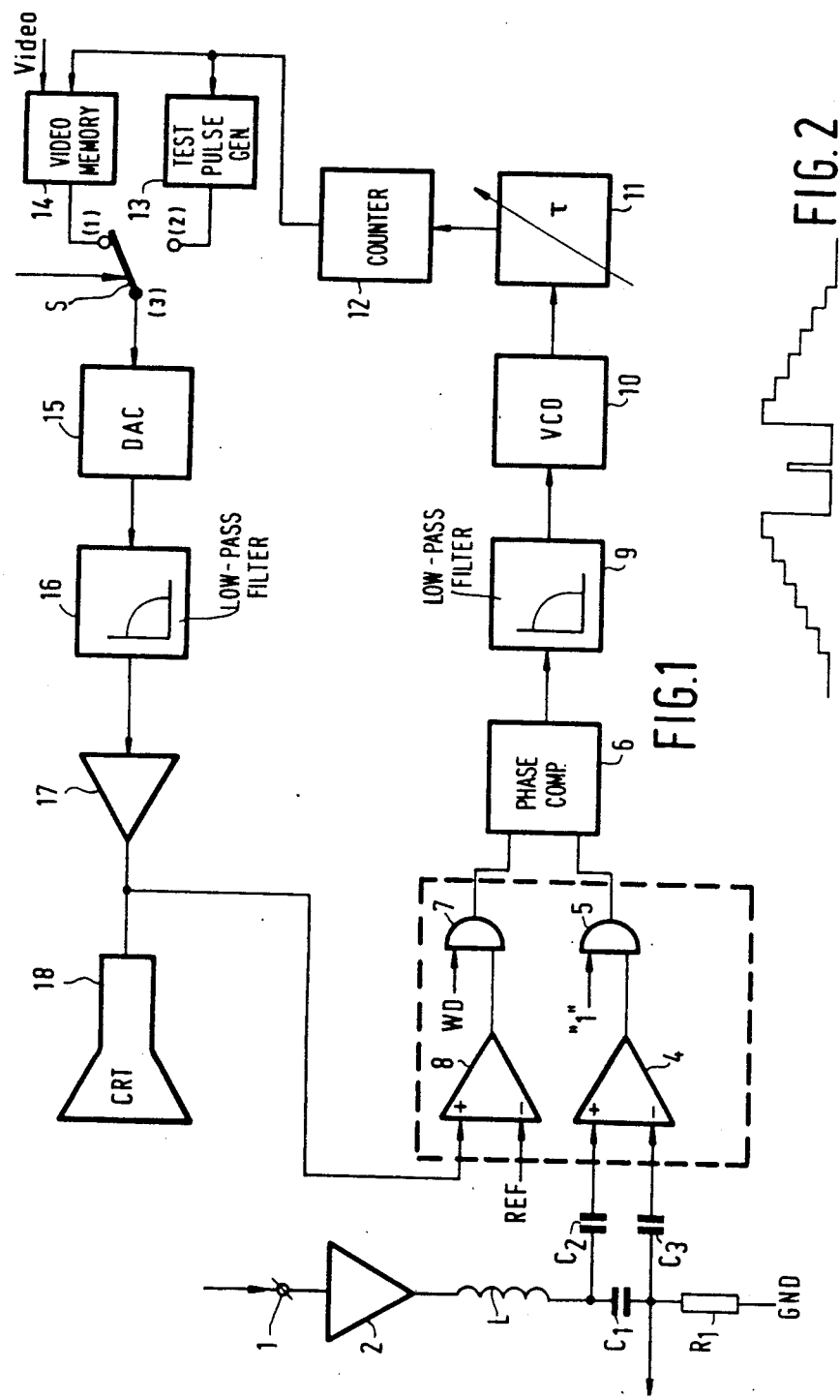

PICTURE PICK-UP OR DISPLAY DEVICE FOR SUCCESSIVE SCANNING IN OPPOSING DIRECTION INCLUDES A CIRCUIT FOR ASSURING VERTICAL SYMMETRY OF THE VIDEO SIGNAL BEING DISPLAYED

BACKGROUND OF THE INVENTION

1. Field of the Invention

The invention relates to a picture pick-up or display device for picking up a scene or for displaying a scene image, the device comprising line deflection circuit for generating a symmetrical line deflection current through a line deflection coil, and a video signal processing circuit having a memory for storing video information and for alternately generating and supplying the video information of a line in one direction and of a subsequent line in the opposite direction, and a clock oscillator for generating a clock signal for reading the video information from the memory, the clock oscillator being incorporated in a control loop which further comprises a counter for counting pulses of the clock signal, and a phase comparison stage and measuring means for receiving a first signal from the line deflection circuit and a second signal from a signal generator, which is also incorporated in the control loop for supplying the second signal at measuring instants, the control loop being adapted to cause the first and the second signal to occur substantially simultaneously at the measuring instants.

2. Description of the Related Art

A picture display device of this type is known from U.S. Pat. No. 4,672,449 (PHN 11.432). In the case of symmetrical line deflection, in which the horizontal lines are successively scanned in the opposite direction, additional measures have to be taken to guarantee that pixels which must lie on a vertical line are indeed displayed exactly underneath each other. This patent describes an embodiment in which, to this end, a first signal corresponding to the zero crossing of the line deflection current is compared with a second signal by means of the phase comparison stage, which signal is a delayed clock signal corresponding to half the video information of a line. Due to the action of the control loop, the delay is controlled in such a way that the first and the second signals substantially conincide so that the video information components corresponding to the centers of the picture lines are displayed exactly underneath each other. However, since the symmetrical line deflection is very sensitive to phase errors, temperature influences and/or ageing phenomena may cause the edges of the picture to be fringed.

Said Patent describes a second embodiment in which delay errors are compensated by means of a second control loop and in which the video information is defined with respect to the line deflection current. The first control loop controls the frequency and the second control loop controls the phase of the second signal. The second signal is generated during the field blanking interval and is not visible.

SUMMARY OF THE INVENTION

It is one of the objects of the invention to provide a circuit arrangement which has the same object as the second embodiment described in said Patent, but which is simpler.

To this end a picture pick-up or display device according to the invention is characterized in that the measuring means comprise a maximum value detector for applying the first signal to the phase comparison stage substantially at the instant when the line deflection current has a maximum value, each measuring instant substantially coinciding with one count of the counter during the line blanking interval.

The invention is based on the recognition that the measuring instants are now so frequent that a large phase error cannot be produced, which leads to a greater stability. As a result, only one control loop is required so that the circuit arrangement is indeed simpler. Since the measurement is effected every other line instead of during each field, the second signal, the test pulse, is generated during the line blanking interval so that the signal is invisible. Said U.S. Pat. No. 4,672,449 advises against the measurement at the instant when the deflection current is maximum. Due to the measure according to the invention, it is exactly this instant at which the measurement is effected, which yeilds the envisioned simplification.

In further embodiment, a picture pick-up or display device according to the invention is characterized in that the maximum value detector comprises a comparator coupled to the line deflection coil for determining the instant when the line deflection current has a substantially maximum value.

The maximum value of the line deflection current is measured by measuring the zero crossing of the voltage across a capacitor arranged in series with the deflection coil. This measurement is not very sensitive to noise and interference because the capacitor conveys a sinusoidal voltage having a large amplitude.

BRIEF DESCRIPTION OF THE DRAWING

The invention will now be described in greater detail by way of example with reference to the accompanying drawing, in which:

FIG. 1 shows an embodiment of a picture display device according to the invention; and

DESCRIPTION OF THE PREFERRED EMBODIMENT

FIG. 2 shows the video signal with the test pulse.

FIG. 1 shows an embodiment of a circuit arrangement of a picture display device according to the invention. An input 1 of the circuit arrangement receives a sinusoidal voltage of half the line frequency, for example, from a sine oscillator. The line frequency is herein understood to mean the number of horizontal lines scanned each second on the display screen of a picture display tube by the electron beam(s) generated in this tube. The voltage is applied to a deflection output stage 2 which generates a deflection current and which applies this current to a horizontal deflection coil L. A capacitor C1 is arranged in series with this coil. The elements L and C1 combined constitute a series resonant circuit whose tuning frequency is substantially equal to half the line frequency. During a first half of a line, a current flows through the elements L and C1 in one direction and during the subsequent second half of the line, the current flows in the opposite direction. Consequently, the video information of one line is written on the screen in one direction and that of a subsequent line is written in an opposite direction.

A negative feedback resistor R1 is arranged in series with the network L, C1. Each terminal of the capacitor C1 is coupled to an input of a comparator 4 via capacitors C2 and C3, respectively. The output of the comparator 4 is connected to an input of a phase comparator 6 via an AND gate 5. A first input of the AND gate 5 receives a digitally high (1) signal.

A second input of the phase comparator 6 receives a signal from a second AND gate 7. A first input of the AND gate 7 receives a pulsatory signal WD and a second input receives a signal from a comparator 8. The signal WD is digitally high only during a part of the line period, namely during the line blanking interval, and the output is low during the remaining period. An output of the phase comparator 6 supplies a signal which is dependent on the phase difference between the two input signals of the phase comparator 6. The output signal is applied to a lowpass filter 9. The output signal of the filter 9 controls a voltage-controlled clock oscillator 10. The oscillator 10 drives a delay circuit 11. An output of the delay circuit 11 supplies a delayed clock signal to a counter 12. The counter 12 supplies clock pulses to a test pulse generator 13 and also to a clock input of a video memory 14. A signal input of the video memory 14 receives video information. An output of the video memory 14 is connected to a first switching contact (1) of a switch S and an output of the test pulse generator 13 is connected to a second switching contact (2) of the switch S. The switch S is operated by line frequency pulses which ensure that the switch S is in position (2) during the line blanking interval and in position (1) during the remaining line period.

The master contact (3) of the switch S is connected to a D/A converter 15. An output of the converter 15 supplies an analog signal which is applied to a suitable electrode of a picture display tube 18 after it has been filtered in a second lowpass filter 16 and amplified in a video amplifier 17. The output signal of the video amplifier 17 is also applied to the second comparator 8. The comparator 8 compares this signal with a reference signal REF with which the control loop is closed. The reference signal is a d.c. signal having, for example, a value corresponding to half the height of the test pulse.

The foregoing is partly known from U.S. Pat. No. 4,672,449 filed by the Applicant and herein incorporated by reference.

The circuit arrangement operates as follows. The zero crossing of the voltage across the capacitor C1 is detected by means of the comparator 4, while the capacitors C2 and C3 ensure a d.c. separation between the series resonant network L and C1 and the comparator 4. The voltage across the capacitor C1 differs 90 degrees in phase from the deflection current through the deflection coil L. The maximum value of the deflection current is thus determined by determining the zero crossing of the voltage across the capacitor C1. This maximum value of the deflection current results in a deflection at one of the edges of the display screen, i.e. approximately halfway the line blanking interval, corresponding to the measuring instants. It is only at these instants that the signal at the second input of the AND gate 7 is passed on to the output of the AND gate 7.

The delay circuit 11 applies the delayed signal to the counter 12. The counter is a modulo-P-counter 12 in which P is the number of clock pulses corresponding to the number of pixels in a horizontal line. During the active part of the line period, the video information of the pixels stored in the video memory 14 is read by means of the sampling pulses from the counter 12 and is passed on to the D/A converter 15 via the switch S in position (1).

The video information is displayed in known manner alternately from left to right and from right to left on the display screen of the picture display tube 18.

During the line blanking interval, the test pulse, which is not visible on the screen and which originates from the test pulse generator 13, is applied to the D/A converter 15 via the switch in position (2). The instant of occurrence of the test pulse corresponds to the clock signal pulse which occurs substantially halfway the line blanking interval. The counter 12 is reset after this clock signal pulse and before the start of the next line period. FIG. 2 shows the test pulse between two consecutive video lines at the output of amplifier 17.

The signal at the output of the video amplifier 17 is compared with the reference signal REF in the comparator 8. If the signal at the output of the amplifier 17 corresponds to the reference signal, the comparator 8 applies a detection signal to the AND gate 7. The AND gate 7 can pass on this detection signal to the phase comparator 6 only during the line blanking interval because the second input of AND gate 7 receives a digitally high signal, the signal WD, only during this interval. In the stationary state of the phase control loop comprising the elements 4 to 17, the input signals of the phase comparison state 6 substantially conincide. Hence, the instant of occurrence of the test pulse and the instant of occurrence of the maximum value of the deflection current coincide. The video information is displayed on the screen substantially at the correct instant.

To ensure that the input signals of the phase comparator 6 have the same delay, the AND gate 5 is arranged between the comparator 4 and the phase comparator 6, the AND gate 5 delaying the signal from the comparator 4 as much as the AND gate 7 delays the signal from the comparator 8.

The two comparators 4 and 8 are preferably incorporated in the same integrated circuit so that they react equally to temperature variations and ageing phenomena and the like.

The test pulse occurring at the output of the output amplifier 17 has a value of, for example 100 V. This makes it impossible to apply this pulse to the AND gate 7 directly. By applying the test pulse to the comparator 8 and comparing it with the reference signal, a signal which has a smaller amplitude and which can be applied to the AND gate 7 is obtained at the output of the comparator 8. It will be evident that the comparator 8 may be replaced by an attenuator, but the comparator 8 has the advantage that the two input signals of the phase comparator 6 follow corresponding paths and are thus subject to the same delay. A drawback of an attenuator is that the input signal does not have an exact digital value, while this input signal may also vary with temperature, etc.

The oscillator 10 must be very stable, inter alia because deviations from the clock frequency (jitter) of the oscillator 10 may cause display errors which are predominately visible when displaying vertical lines. To ensure that the output signal of the loop filter 9 is substantially a d.c. voltage, the filter 9 must have a time constant which is a number of times larger than the duration of a horizontal line. Consequently, the oscillator 10 can only vary very slowly, which is desirable so as to render it insensitive to interference. The delay circuit 11 is adjusted once during manufacture so as to compensate for manufacturing tolerances.

The oscillator 10 and the delay circuit 11 may be implemented in known manner. The oscillator 10 may comprise an odd number, for example 3 inverters arranged in series. The switching speed of the inverters and hence the oscillator frequency can be varied by varying the supply current for the inverters. Three inverters provide the possibility of obtaining three clock signals at the same frequency but with a mutual phase difference of 120 degrees. The three clock signals are applied to, for example three OR gates each receiving a control signal as a second input signal. If this signal is digitally high, the output conveys a high signal, irrespective of whether the clock signal is high or low. If the relevant control signal is low, the clock signal determines whether the output of the OR gate is high or low. The three outputs of the OR gates constitute the three inputs of an AND gate. The output of the AND gate supplies the delayed output signal. Any desired delay can be obtained by rendering one of the control signals alternately low, while the other two are high. The OR gates are then active as controlled switches for modifying the phase of the oscillator signal.

It will be evident that the instant of the maximum line deflection current may alternatively be measured in other manners. For example, a differentiator may be connected to the junction point of the capacitor C1 and the resistor R1 or to the junction point of the deflection output stage 2 and the coil L, while the elements C2, C3 and 4 are omitted. The instant when the differentiated voltage is zero is the instant when the line deflection current has a maximum value. It will also be evident that slight modifications of the circuit arrangement of FIG. 1 render it suitable for symmetrical deflection modes other than the sinusoidal mode, for example triangular deflection. It will further be evidence that similarly as the circuit arrangement described in U.S. Pat. No. 4,672,499, the described circuit arrangement is suitable for a picture pick-up device.

I claim:

1. A picture pick-up or display device for picking up a scene or for displaying a scene image, said device, comprising a line deflection circuit for generating a symmetrical line deflection current through a line deflection coil, a video signal processing circuit having a memory for storing video information and for alternately generating and supplying the video information of a line in one direction and of the subsequent line in the opposite direction, and a clock oscillator for generating a clock signal for reading the video information from the memory, the clock oscillator being incorporated in a control loop which further comprises a counter for counting pulses of the clock signal, and a phase comparison stage and measuring means for receiving a first signal from the line deflection circuit and a second signal from a signal generator which is also incorporated in the control loop for supplying the second signal at measuring instants, the control loop being adapted to cause the first and the second signal to occur substantially simultaneously at the measuring instants, characterized in that the measuring means comprise a maximum value detector for applying the first signal to the phase comparison stage substantially at the instant when the line deflection current has a maximum value, each measuring instant substantially coinciding with one count of the counter during the line blanking interval.

2. A device as claimed in claim 1, characterized in that the maximum value detector comprises a comparator coupled to the line deflection coil for determining the instant when the line deflection current has a substantially maximum value.

3. A device as claimed in claim 2, in which a capacitor is arranged in series with the line deflection coil and constitutes a series resonant circuit therewith, characterized in that the maximum value detector is a zero crossing detector coupled to the terminals of the capacitor for determining the instant when the voltage across the capacitor is substantially zero.

4. A device as claimed in claim 3, characterized in that each terminal of the capacitor is connected to inputs of the zero crossing detector via a separating capacitor.

5. A device as claimed in claim 1, characterized in that the second signal is a pulse which occurs substantially halfway the line blanking interval.

6. A device as claimed in claim 1, characterized in that said device further comprises a comparator for comparing the second signal with a reference signal, said comparator thereby effectively reducing the amplitude of said second signal prior to being applied to said phase comparison stage.

7. A device as claimed in claim 6, characterized in that the comparator is coupled to the phase comparison stage via a gate which is open during the line blanking interval so as to pass the second signal.

8. A device as claimed in claim 7, characterized in that the maximum value detector is coupled to the phase comparison stage via a second gate for passing the first signal from the maximum value detector.

* * * * *